United States Patent
Takazane

(10) Patent No.: US 11,402,553 B2
(45) Date of Patent: Aug. 2, 2022

(54) GALVANOMETER MIRROR AND LASER MACHINE

(71) Applicant: FANUC CORPORATION, Yamanashi (JP)

(72) Inventor: Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 16/429,242

(22) Filed: Jun. 3, 2019

(65) Prior Publication Data

US 2019/0383978 A1    Dec. 19, 2019

(30) Foreign Application Priority Data

Jun. 14, 2018 (JP) .............................. JP2018-113863

(51) Int. Cl.
*G02B 5/08* (2006.01)
(52) U.S. Cl.
CPC ................................ *G02B 5/0875* (2013.01)
(58) Field of Classification Search
CPC .......... G02B 5/282; G02B 5/285; G02B 5/08; G02B 5/0858; G02B 26/105; G02B 27/141; G02B 27/142; G02B 5/0816; G02B 5/26; C03C 17/36; C03C 17/3615; C03C 17/3649
See application file for complete search history.

(56) References Cited

U.S. PATENT DOCUMENTS

| 5,257,140 A | * | 10/1993 | Rogers | G02B 5/0833 359/589 |
| 5,449,413 A | * | 9/1995 | Beauchamp | C03C 4/0085 136/256 |
| 5,608,577 A | * | 3/1997 | Eda | G02B 5/0833 359/584 |
| 7,206,125 B2 | * | 4/2007 | Wang | G02B 5/208 359/359 |
| 7,622,746 B1 | * | 11/2009 | Lester | H01L 33/46 257/E33.068 |
| 8,477,413 B2 | * | 7/2013 | Mori | G02B 19/0023 359/359 |

(Continued)

FOREIGN PATENT DOCUMENTS

| CN | 1979230 A | 6/2007 |
| CN | 102112897 A | 6/2011 |

(Continued)

OTHER PUBLICATIONS

"substrate, n.", Oxford English Dictionary, retrieved Aug. 2021 (Year: 2021).*

(Continued)

*Primary Examiner* — Christopher Stanford
(74) *Attorney, Agent, or Firm* — Studebaker & Brackett PC

(57) ABSTRACT

A galvanometer mirror according to the present invention comprises: a transparent substrate; a laser beam reflection layer arranged on one surface side of the substrate and causing reflection of a laser beam having a predetermined wavelength; and a machining point beam reflection layer arranged on the other surface side of the substrate and having higher reflectivity for a beam having a wavelength except the predetermined wavelength than the laser beam reflection layer.

10 Claims, 9 Drawing Sheets

(56) References Cited

U.S. PATENT DOCUMENTS

| | | | |
|---|---|---|---|
| 8,498,047 B2 * | 7/2013 | Ishihara | G02B 5/0858 359/361 |
| 9,599,752 B2 * | 3/2017 | Laurent | C03C 17/3626 |
| 10,141,480 B2 * | 11/2018 | Lee | H01L 27/153 |
| 2004/0263937 A1 * | 12/2004 | Fujii | G02B 26/0841 359/199.1 |
| 2005/0243396 A1 * | 11/2005 | Fujii | G02B 26/0841 359/224.1 |
| 2007/0029289 A1 | 2/2007 | Brown | |
| 2010/0020401 A1 * | 1/2010 | Fujimoto | G02B 5/1861 359/589 |
| 2011/0096391 A1 * | 4/2011 | Kanai | F24S 23/82 359/359 |

FOREIGN PATENT DOCUMENTS

| | | | | |
|---|---|---|---|---|
| CN | 105022108 A | * | 11/2015 | |
| CN | 107710025 A | * | 2/2018 | |
| FR | 2859721 A1 | * | 3/2005 | ....... B32B 17/10018 |
| JP | S59-111619 A | | 6/1984 | |
| JP | H05-228677 A | | 9/1993 | |
| JP | 07005311 A | * | 1/1995 | |
| JP | H07-335962 A | | 12/1995 | |
| JP | H0915407 A | * | 1/1997 | |
| JP | 2011-174967 A | | 9/2011 | |
| JP | 2015-141372 A | | 8/2015 | |
| JP | 2017-129650 A | | 7/2017 | |
| JP | 2017-524558 A | | 8/2017 | |
| KR | 101146619 B1 | * | 5/2012 | |
| WO | WO-9701439 A1 | * | 1/1997 | .......... G02B 5/0866 |
| WO | 0881508 A1 | * | 12/1998 | |
| WO | WO-2018003589 A1 | * | 1/2018 | ............. B60K 35/00 |

OTHER PUBLICATIONS

An Office Action mailed by the Japanese Patent Office dated May 12, 2020, which corresponds to Japanese Patent Application No. 2018-113863 and is related to U.S. Appl. No. 16/429,242; with English language translation.

An Office Action mailed by China National Intellectual Property Administration dated Sep. 15, 2021, which corresponds to Chinese Patent Application No. 201910502329.0 and is related to U.S. Appl. No. 16/429,242; with English language translation.

* cited by examiner

GALVANOMETER MIRROR AND LASER MACHINE

This application is based on and claims the benefit of priority from Japanese Patent Application No. 2018-113863, filed on 14 Jun. 2018, the content of which is incorporated herein by reference.

BACKGROUND OF THE INVENTION

Field of the Invention

The present invention relates to a galvanometer mirror for reflecting a laser beam, and a laser machine with the galvanometer mirror.

Related Art

Laser machines have been used in marking or welding in the field of laser machining. Patent document 1 discloses a laser machine that machines a machining target with a laser beam reflected on a first reflector and a second reflector (galvanometer mirror).

When the foregoing laser machine machines the machining target with a laser, a beam is generated at a machining point on the machining target. This beam from the machining point follows a path opposite a path for the laser beam to be reflected on the second reflector (galvanometer mirror), and then returns to the first reflector. In such a case, the machined status of the machining target can be determined by taking the beam from the machining point to the outside through the first reflector and detecting the intensity and wavelength of this beam from the machining point using a detector, for example.

At this time, in order to prevent attenuation of the beam from the machining point, this beam is required to be reflected with higher reflectivity than the second reflector (galvanometer mirror) and guided from the first reflector to the detector.

Patent Document 1: Japanese Unexamined Patent Application, Publication No. H05-228677

SUMMARY OF THE INVENTION

However, the layer of the second reflector (galvanometer mirror) is to be thickened if being formed by stacking a layer for reflecting the laser beam on a layer for reflecting the beam from the machining point. This degrades the smoothness of the layer to reduce the reflectivity of the second reflector (galvanometer mirror).

The present invention has been made in view of the foregoing situation, and is intended to provide a galvanometer mirror capable of increasing reflectivity for a beam having a predetermined wavelength and reflectivity for a beam having a wavelength except the predetermined wavelength by enhancing a layer smoothness.

(1) The present invention relates to a galvanometer mirror (galvanometer mirror 60, 160, 260, 360, 460, 560 described later, for example) comprising: a transparent substrate (substrate 61 described later, for example); a first reflection layer (laser beam reflection layer 62 described later, for example) arranged on one surface side of the substrate and causing reflection of a laser beam having a predetermined wavelength; and a second reflection layer (machining point beam reflection layer 64 described later, for example) arranged on the other surface side of the substrate and having higher reflectivity for a beam having a wavelength except the predetermined wavelength than the first reflection layer.

(2) In the galvanometer mirror described in (1), the substrate may have a thermal expansion coefficient of $1.0 \times 10^{-7}$/° C. or less.

(3) In the galvanometer mirror described in (1) or (2), the substrate may have transmittance of 80%/cm or more for a beam from 400 to 2000 nm.

(4) In the galvanometer mirror described in any one of (1) to (3), a material for the substrate may be synthetic quartz.

(5) In the galvanometer mirror described in any one of (1) to (4), the first reflection layer may be composed of a multi-layered film and the second reflection layer may be composed of a multi-layered film.

(6) In the galvanometer mirror described in any one of (1) to (4), the first reflection layer may be composed of a multi-layered film and the second reflection layer may be composed of a metal film.

(7) In the galvanometer mirror described in any one of (1) to (4), the first reflection layer may be composed of a multi-layered film, and the second reflection layer may be composed of a multi-layered film (multi-layered film with layers 66, 67 described later, for example) and a metal film (metal film 68 described later, for example) formed on the outermost surface of the multi-layered film.

(8) In the galvanometer mirror described in (6) or (7), a material for the metal film may be gold, silver, copper, or aluminum.

(9) In the galvanometer mirror described in (5) to (7), each of the multi-layered films may be a film including high-refractivity layers (high-refractivity layers 66 described later, for example) and low-refractivity layers (low-refractivity layers 67 described later, for example) arranged alternately and repeatedly.

(10) In the galvanometer mirror described in any one of (1) to (6), the second reflection layer (machining point beam reflection layer 85 described later, for example) may be composed of a rib for increasing the strength of the substrate, and the rib may cause reflection of a beam having a wavelength except the predetermined wavelength in the rib.

(11) In the galvanometer mirror described in any one of (1) to (6), the second reflection layer (machining point beam reflection layer 611 described later, for example) may be configured integrally with the substrate, and may be composed of projecting parts (projecting parts 612, 613 described later, for example) formed like stairs as viewed in a direction orthogonal to a rotary axis (rotary axis X described later, for example) of the substrate, and the projecting parts may cause reflection of a beam having a wavelength except the predetermined wavelength in the projecting parts.

(12) A laser machine (laser machine 500 described later, for example) according to the present invention comprises: the galvanometer mirror described in any one of (1) to (11); and a laser oscillator (laser oscillator 100 described later, for example) that emits a laser beam to be applied to the first reflection layer of the galvanometer mirror.

The present invention can provide a galvanometer mirror capable of increasing reflectivity for a beam having a predetermined wavelength and reflectivity for a beam having a wavelength except the predetermined wavelength by enhancing a layer smoothness.

DETAILED DESCRIPTION OF THE INVENTION

Figure 1:
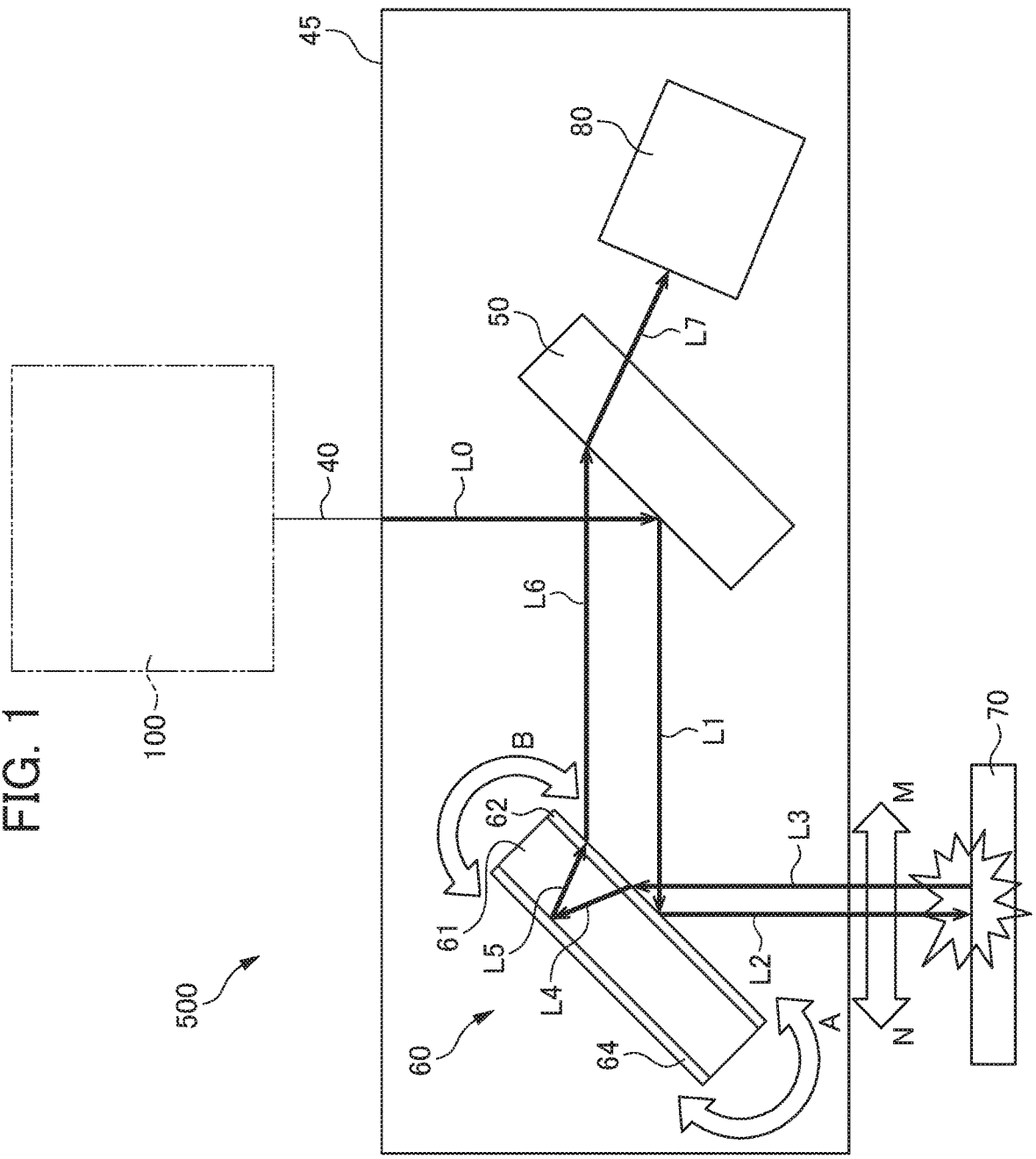
FIG. 1 is a schematic configuration view showing a laser machine as a first embodiment of the present invention.

Embodiments of the present invention will be described below by referring to the drawings. The present invention can be embodied in many different modes, and should not be limited to exemplary embodiments described below. After a structure is described by referring to any of the drawings, a structure comparable to the structure described previously will be given the same sign or a sign with the same last two digits in the description and the drawings, and the detailed description of the comparable structure may be omitted, where appropriate.

First Embodiment

[Overall Configuration of Laser Machine]

Figure 2:
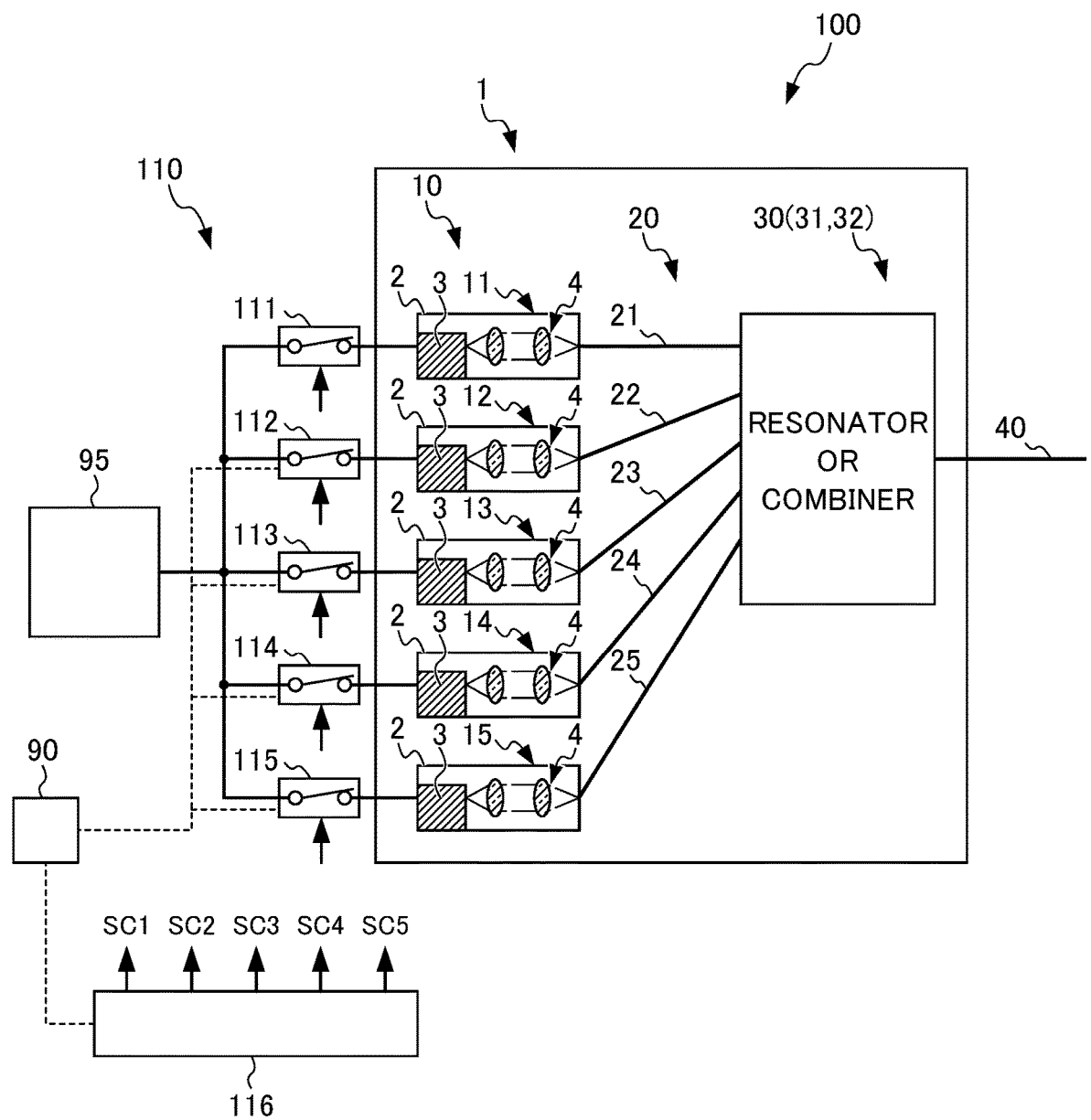
FIG. 2 is schematic configuration view showing a laser oscillator of the laser machine as the first embodiment of the present invention.

A laser machine according to a first embodiment of the present invention will be described by referring to the drawings. FIG. 1 is a schematic configuration view showing the laser machine as the first embodiment of the present invention. FIG. 2 is schematic configuration view showing the laser oscillator of the laser machine as the first embodiment of the present invention. As shown in FIG. 1, a laser machine 500 of the first embodiment includes a laser oscillator 100 and a laser cutting head 45. As shown in FIG. 2, the laser oscillator 100 includes a laser output unit 1, a first optical fiber 40, and a module driver 110.

[Laser Output Unit]

As shown in FIG. 2, the laser output unit 1 is a unit that outputs a laser beam. The laser output unit 1 includes multiple (in the illustration of the drawing, five) semiconductor laser modules 10 (11, 12, 13, 14, 15), an in-module optical fiber 20 (21, 22, 23, 24, 25), and a resonator or a combiner 30 (resonator 31, combiner 32).

[Semiconductor Laser Module]

The semiconductor laser module 10 (11, 12, 13, 14, 15) includes a housing 2, a semiconductor laser element 3, and a lens 4. The housing 2 houses the semiconductor laser element 3 and the lens 4. The semiconductor laser element 3 emits a laser beam. The lens 4 refracts and focuses a laser beam from the semiconductor laser element 3.

The semiconductor laser module 10 (11, 12, 13, 14, 15) forms a semiconductor laser module group including a mixture of semiconductor laser modules of different rated outputs. As a specific example, the semiconductor laser module group includes a mixture of a semiconductor laser module of 50 W and a semiconductor laser module of 100 W. While a laser output from a laser oscillator can be controlled only in units of 100 W using only the semiconductor laser module of 100 W, providing the semiconductor laser module of 50 W further like in this case allows control of a laser output in units of 50 W. By providing a semiconductor laser module of 10 W or less in the semiconductor laser module group, it becomes possible to control a laser output more finely. A laser output can also be controlled by controlling a current in the semiconductor laser module.

[In-Module Optical Fiber]

The in-module optical fiber 20 (21, 22, 23, 24, 25) is derived from the housing 2. The in-module optical fiber 20 (21, 22, 23, 24, 25) is for propagating a laser beam from the semiconductor laser module 10 (11, 12, 13, 14, 15), and for supplying the laser beam to the resonator or combiner 30 (resonator 31, combiner 32).

[Resonator or Combiner]

In the presence of the resonator 31, a laser beam from the semiconductor laser module 10 (11, 12, 13, 14, 15) is used as an excitation beam for the resonator 31. In the presence of only the combiner 32, laser beams from the multiple semiconductor laser modules 11, 12, 13, 14, and 15 are focused by the combiner 32 and used. Both the resonator 31 and the combiner 32 may be provided. By employing any of these methods, the laser oscillator 100 outputs a laser beam through the first optical fiber 40 for output.

[First Optical Fiber]

The first optical fiber 40 is for propagating (passing, guiding) a laser beam from the laser output unit 1 including the semiconductor laser module 10 (11, 12, 13, 14, 15).

[Module Driver]

The module driver 110 is a part that drives the multiple semiconductor laser modules 10 (11, 12, 13, 14, 15) individually.

The module driver 110 applies two control modes as follows selectively to each of the multiple semiconductor laser modules 10 (11, 12, 13, 14, 15) and executes the applied mode: a rated drive mode of driving the semiconductor laser module so as to produce a rated output (turning on a corresponding switch unit); and a stop mode of not driving the semiconductor laser module (turning off a corresponding switch unit). More specifically, the semiconductor laser module 10 (11, 12, 13, 14, 15) is to be placed only in one of the two states, an output OFF state and a rated output ON state. The module driver 110 includes a current supply unit 95 as a power supply, a switch unit 111, a switch unit 112, a switch unit 113, a switch unit 114, and a switch unit 115, a control signal generation unit 116, and a control unit 90.

[Current Supply Unit]

The current supply unit 95 is a unit that supplies the semiconductor laser element 3 of the semiconductor laser module 10 (11, 12, 13, 14, 15) with an excitation current.

[Switch Unit]

Each of the switch units 111, 112, 113, 114, and 115 as a changeover unit is a unit interposed in a circuit for supplying an excitation current from the current supply unit 95 to a corresponding one of the semiconductor laser modules 11, 12, 13, 14, and 15. Each of the switch units 111, 112, 113, 114, and 115 is a unit capable of making a change between supplying an excitation current and not supplying the excitation current from the current supply unit 95 to a corresponding one of the semiconductor laser modules 11, 12, 13, 14, and 15.

[Control Signal Generation Unit]

The control signal generation unit 116 is a unit that generates a control signal SC1, a control signal SC2, a control signal SC3, a control signal SC4, and a control signal SC5 for controlling corresponding ones of the switch units 111, 112, 113, 114, and 115.

[Control Unit]

The control unit 90 controls drive of the switch units 111, 112, 113, 114, and 115, the control signal generation unit 116, and a detector 80 described later.

[Laser Cutting Head]

As shown in FIG. 1, the laser cutting head 45 includes a mirror 50 in front of detector, a galvanometer mirror 60, and the detector 80.

[Mirror in Front of Detector]

The mirror 50 in front of detector is arranged at a position in front of and facing the detector 80. The mirror 50 in front of detector is for reflecting a laser beam having a predetermined wavelength and for transmitting a beam except the laser beam having the predetermined wavelength. If a laser beam output from the laser output unit 1 of the laser oscillator 100 (see FIG. 2) has a wavelength (center wavelength) of 1070 nm, for example, the mirror 50 in front of detector reflects the laser beam having the wavelength (center wavelength) of 1070 nm. Meanwhile, a beam having a wavelength except the wavelength of 1070 nm and generated at a machining target 70 is transmitted through the mirror 50 in front of detector.

[Detector]

The detector 80 is arranged to face the back surface of the mirror 50 in front of detector. The detector 80 detects a beam generated at a machining point on the machining target 70 and having been transmitted through the mirror 50 in front of detector. The control unit 90 can monitor the machined status of the machining target 70 based on a result of the detection by the detector 80, and can determine the properness of the intensity of a laser beam. The detector 80 is configured using a photodiode, for example, capable of detecting the wavelength of a beam.

[Galvanometer Mirror]

The galvanometer mirror 60 is a mirror that rotates about a predetermined rotary axis to change a direction in which a laser beam is propagated. If the galvanometer mirror 60 rotates in a direction of arrows A, for example, a laser beam indicated by an arrow L2 moves in a direction of an arrow M. If the galvanometer mirror 60 rotates in a direction of arrows B, the laser beam indicated by the arrow L2 moves in a direction of an arrow N. The galvanometer mirror 60 is required to cause reflection of both a laser beam and a beam generated at a machining point on the machining target 70. Machining to be done is specifically cutting or welding, for example. While only one galvanometer mirror 60 is illustrated in FIG. 1, two galvanometer mirrors including a galvanometer mirror for X-axis direction scanning and a galvanometer mirror for Y-axis direction scanning are generally prepared. This allows the laser oscillator 100 to apply a laser beam to an intended machining point on the machining target 70.

The galvanometer mirror 60 is required to have high reflectivity. The reason for this is as follows. If the reflectivity of the galvanometer mirror 60 is low, the galvanometer mirror 60 is to absorb a laser beam of a high output such as several kilowatts to attenuate the laser beam. This causes heat generation at the galvanometer mirror 60 to cause the risk of energy loss. The high reflectivity of the galvanometer mirror 60 is intended to suppress such phenomenon.

The galvanometer mirror 60 is required to have a low thermal expansion coefficient and to be lightweight. The low thermal expansion coefficient is required to suppress heat generation and resultant thermal expansion of the galvanometer mirror 60 due to absorption of a laser beam by the galvanometer mirror 60. The lightweight properties are required to rotate the galvanometer mirror 60 easily using a motor.

Figure 3A:
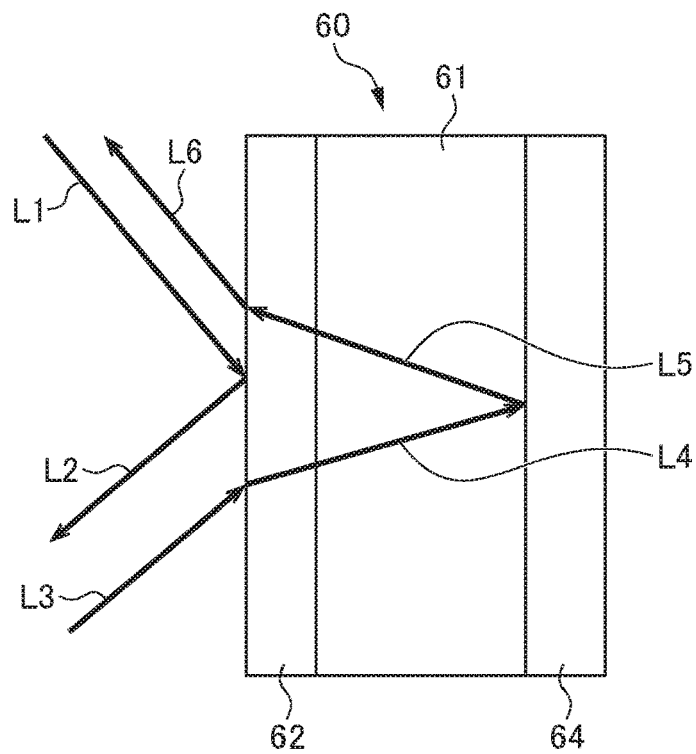
FIG. 3A is a sectional view of a galvanometer mirror as the first embodiment of the present invention.

As shown in FIGS. 1 and 3A, the galvanometer mirror 60 includes a transparent substrate 61, a laser beam reflection layer 62 as a first reflection layer, and a machining point beam reflection layer 64 as a second reflection layer.

[Substrate]

The substrate 61 is made of a transparent material. The reason for this is to reflect a beam on the machining point beam reflection layer 64 arranged on the back side of the substrate 61 after the beam is generated at a machining point and transmitted through the substrate 61. More specifically, the transparent substrate 61 preferably has transmittance of 80%/cm or more for a beam from 400 to 2000 nm. The transparent substrate 61 preferably has a thermal expansion coefficient of $1.0 \times 10^{-6}/°$ C. or less. The reason for this is as follows. The galvanometer mirror 60 is required to have surface roughness of $\lambda/10$ (62 nm) for accurate laser positioning. In order to prevent degradation of the surface roughness to be caused by heat generation, the thermal expansion coefficient of the galvanometer mirror 60 is required to be low. A material for the transparent substrate 61 is synthetic quartz, for example. The synthetic quartz is applicable as a material achieving the foregoing transmittance and thermal expansion coefficient.

[Laser Beam Reflection Layer]

The laser beam reflection layer 62 is arranged on one surface side of the substrate 61. The laser beam reflection layer 62 is composed of a multi-layered film. The laser beam reflection layer 62 causes reflection of a laser beam having a predetermined wavelength. For example, the laser beam reflection layer 62 includes a high-refractivity layer made of tantalum oxide and a low-refractivity layer made of silicon oxide. The thickness and the number of layers of each of the high-refractivity layer and the low-refractivity layer are designed so as to cause reflection of the laser beam having the predetermined wavelength.

[Machining Point Beam Reflection Layer]

The machining point beam reflection layer 64 is arranged on the other surface side of the substrate 61. The machining point beam reflection layer 64 is composed of a multi-layered film. The machining point beam reflection layer 64 is a surface for reflecting a beam generated at a machining point on the machining target 70. The machining point beam reflection layer 64 has higher reflectivity for a beam having a wavelength except the predetermined wavelength than the laser beam reflection layer 62. For example, the machining point beam reflection layer 64 includes a high-refractivity layer made of tantalum oxide and a low-refractivity layer made of silicon oxide. The thickness and the number of layers of each of the high-refractivity layer and the low-refractivity layer are designed so as to provide the machining point beam reflection layer 64 with higher reflectivity for a beam having a wavelength except the predetermined wavelength than the laser beam reflection layer 62.

The reflection layer of the galvanometer mirror 60 is formed by stacking several tens of dielectric multi-layered films. The reflectivity of the galvanometer mirror 60 is affected not only by the number of layers or a layer thicknesses but also by the level of layer smoothness or how few foreign materials exist. Stacking the machining point beam reflection layer 64 and the laser beam reflection layer 62 on each other increases the number of layers. This reduces smoothness, causes more foreign materials, and reduces reflectivity. In this regard, the laser beam reflection layer 62 is arranged on the front side of the substrate 61 and the machining point beam reflection layer 64 is arranged on the back side of the substrate 61 to reduce the number of layers on the front side of the galvanometer mirror 60. This increases the reflectivity of the galvanometer mirror 60 for a laser beam and the reflectivity of the galvanometer mirror 60 for a machining point beam. If the laser beam has a wavelength of 1070 nm, for example, the laser beam reflection layer 62 causes reflection of the laser beam having the wavelength of 1070 nm and the machining point beam reflection layer 64 causes reflection of a beam having a different wavelength.

The following describes how a laser beam travels. As shown in FIG. 1, the laser beam is output from the laser output unit 1 of the laser oscillator 100 (see FIG. 2) and travels like an arrow L0. The laser beam is thereafter reflected on the mirror 50 in front of detector and travels like an arrow L1. Then, the laser beam is reflected on the laser beam reflection layer 62 of the galvanometer mirror 60 and travels like the arrow L2. Then, the laser beam is applied to the machining target 70 and used for machining of the machining target 70. A beam generated at a machining point on the machining target 70 travels like an arrow L3, is transmitted through the laser beam reflection layer 62 and the substrate 61 of the galvanometer mirror 60 like an arrow L4, and is reflected on the machining point beam reflection layer 64 of the galvanometer mirror 60. The reflected beam is transmitted through the substrate 61 and the laser beam reflection layer 62 of the galvanometer mirror 60 like an arrow L5, and travels like an arrow L6. The beam generated at the machining point on the machining target 70 is thereafter transmitted through the mirror 50 in front of detector, and then detected by the detector 80.

The galvanometer mirror 60 of the first embodiment achieves the following effect, for example. The galvanometer mirror 60 of the first embodiment includes the transparent substrate 61, the laser beam reflection layer 62 arranged on one surface side of the substrate 61 and causing reflection of a laser beam having a predetermined wavelength, and the machining point beam reflection layer 64 arranged on the other surface side of the substrate 61 and having higher reflectivity for a beam having a wavelength except the predetermined wavelength than the laser beam reflection layer 62.

Thus, the galvanometer mirror 60 of the first embodiment is given enhanced layer smoothness, thereby allowing increase in reflectivity for a beam having the predetermined wavelength and reflectivity for a beam having a wavelength except the predetermined wavelength. The transparency of the substrate 61 reduces a degree of absorption of a beam having a wavelength except the predetermined wavelength by the substrate 61. This increases the reflectivity of the machining point beam reflection layer 64 for a beam having a wavelength except the predetermined wavelength.

In the galvanometer mirror 60 of the first embodiment, the substrate 61 has a thermal expansion coefficient of $1.0 \times 10^{-6}/°$ C. or less. The thermal expansion coefficient of the substrate 61, which is $1.0 \times 10^{-6}/°$ C. or less, reduces change in the shape of the galvanometer mirror 60 to be caused by heat generation.

In the galvanometer mirror 60 of the first embodiment, the substrate 61 has transmittance of 80%/cm or more for a beam from 400 to 2000 nm. This facilitates transmission of a beam generated at a machining point on the machining target 70 through the substrate 61, so that accuracy of detection by the detector 80 is unlikely to be reduced.

In the galvanometer mirror 60 of the first embodiment, a material for the substrate 61 is synthetic quartz. Using synthetic quartz as a material for the substrate 61 allows the substrate 61 to be transparent and to have a low thermal expansion coefficient reliably.

In the galvanometer mirror 60 of the first embodiment, the laser beam reflection layer 62 is composed of a multi-layered film, and the machining point beam reflection layer 64 is composed of a multi-layered film. Using the multi-layered film for forming each of the laser beam reflection layer 62 and the machining point beam reflection layer 64 achieves high reflectivity.

Comparative Example

Figure 3B:
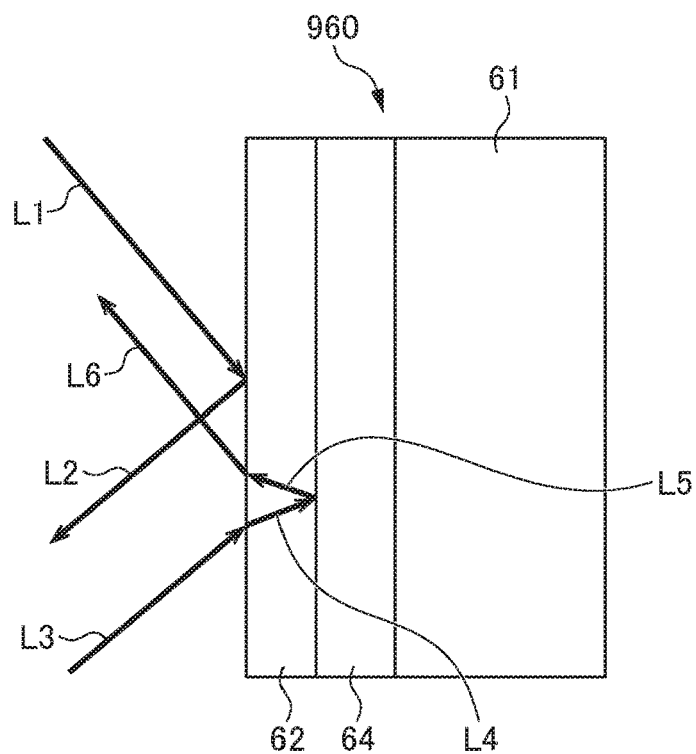
FIG. 3B is a sectional view of a galvanometer mirror as a comparative example.

FIG. 3B is a sectional view schematically showing a part of the configuration of a galvanometer mirror 960 according to a comparative example. The galvanometer mirror 960 is formed by stacking the laser beam reflection layer 62 and the machining point beam reflection layer 64 on one surface side of the substrate 61.

The following describes how a laser beam travels. As shown in FIG. 3B, the laser beam is output from the laser output unit 1 and travels like an arrow L1. The laser beam is thereafter reflected on the laser beam reflection layer 62 and travels like an arrow L2. As shown in FIG. 1, the laser beam is applied to the machining target 70 and used for machining of the machining target 70. A beam generated at a machining point on the machining target 70 travels like an arrow L3 shown in FIG. 3B. Then, the beam is transmitted through the laser beam reflection layer 62 like an arrow L4, reflected on the machining point beam reflection layer 64, transmitted through the laser beam reflection layer 62 like an arrow L5, and then travels like an arrow L6.

In the configuration of the comparative example, in the galvanometer mirror 960, the laser beam reflection layer 62 and the machining point beam reflection layer 64 are stacked on the same surface side of the substrate 61. This reduces layer smoothness, and reduces reflectivity on the laser beam reflection layer 62 for a beam having a predetermined wavelength and reflectivity on the machining point beam reflection layer 64 for a beam having a wavelength except the predetermined wavelength.

First Modification

Figure 4A:
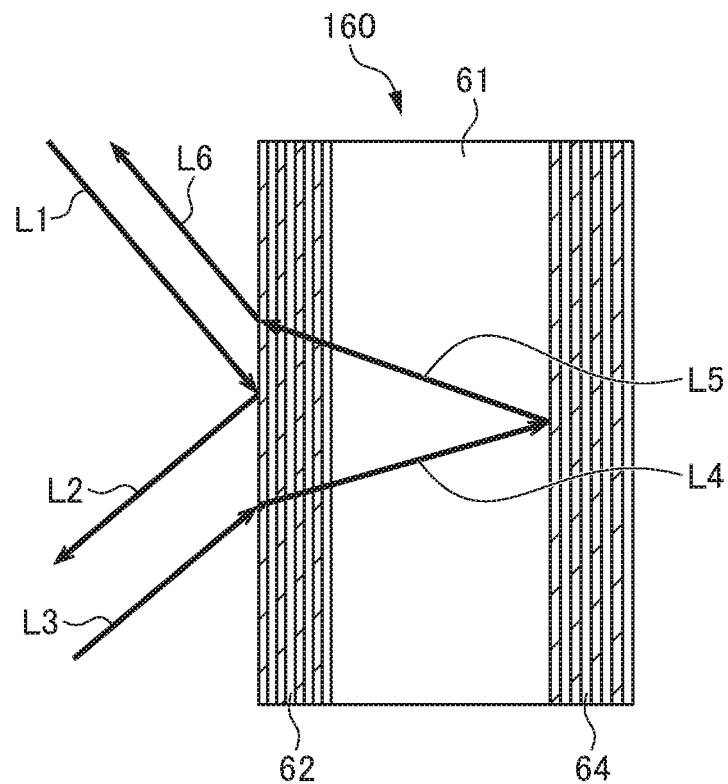
FIG. 4A is a sectional view of a galvanometer mirror as a first modification of the present invention.
Figure 4B:
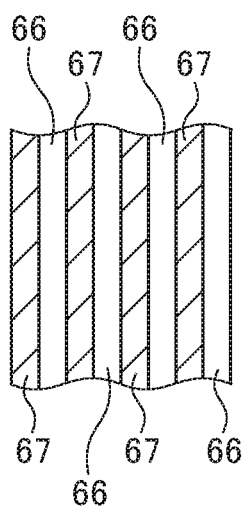
FIG. 4B is a sectional view showing a part of FIG. 4A in an enlarged manner.

FIG. 4A is a sectional view showing the configuration of a galvanometer mirror 160 according to a first modification. FIG. 4B is a sectional view showing a part of FIG. 4A in an enlarged manner. A multi-layered film of the laser beam reflection layer 62 is a film including high-refractivity layers 66 and low-refractivity layers 67 arranged alternately and repeatedly. Like that of the laser beam reflection layer 62, a multi-layered film of the machining point beam reflection layer 64 is a film including the high-refractivity layers 66 and the low-refractivity layers 67 arranged alternately and repeatedly. Titanium oxide or tantalum oxide is used for forming the high-refractivity layer 66, for example. Silicon oxide or magnesium fluoride is used for forming the low-refractivity layer 67, for example. The thickness of a single layer is from about several tens to about several hundreds of nanometers. The number of layers or a layer thickness may be changed between the high-refractivity layer 66 and the low-refractivity layer 67 according to design.

Second Modification

Figure 5A:
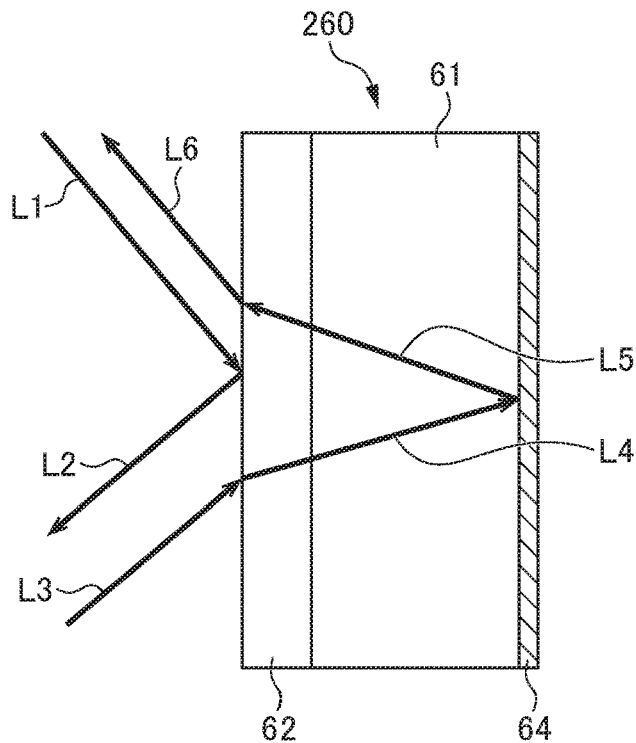
FIG. 5A is a sectional view of a galvanometer mirror as a second modification of the present invention.

FIG. 5A is a sectional view showing the configuration of a galvanometer mirror 260 according to a second modification. The laser beam reflection layer 62 is composed of a multi-layered film. The machining point beam reflection layer 64 is required to have high reflectivity for a wide wavelength band. To achieve this, the machining point beam reflection layer 64 is composed of a metal film. The metal film is made of gold, silver, copper, or aluminum. In the configuration of the second modification, the machining point beam reflection layer 64 is made of the metal film. The metal film has high reflectivity for a wide wavelength, so that it can cause reflection of a variety of wavelength components in a beam emitted from a machining point. Further, using gold, silver, copper, or aluminum as a material for the metal film increases the reflectivity of the galvanometer mirror 260.

Third Modification

Figure 5B:
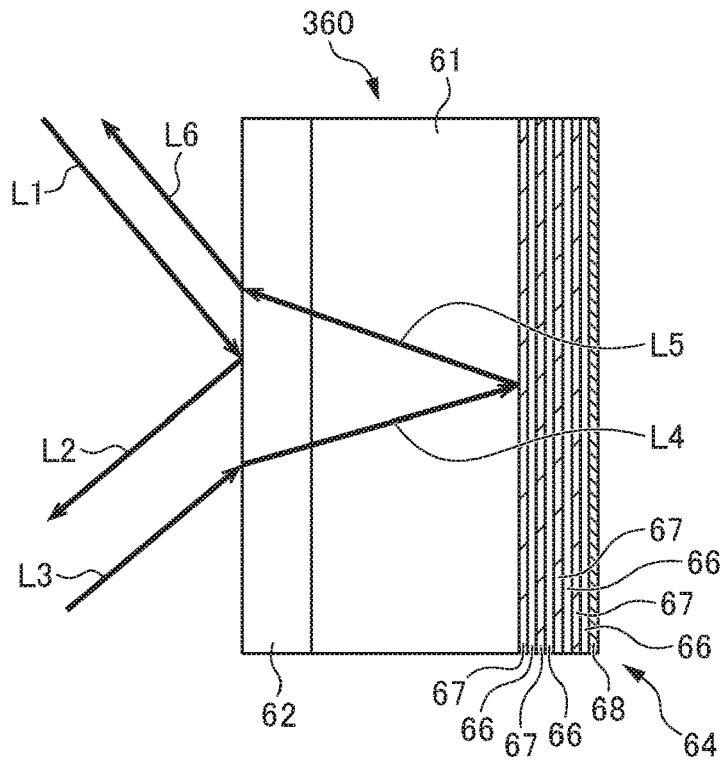
FIG. 5B is a sectional view of a galvanometer mirror as a third modification of the present invention.

FIG. 5B is a sectional view showing the configuration of a galvanometer mirror 360 according to a third modification. The laser beam reflection layer 62 is composed of a multi-layered film. The machining point beam reflection layer 64 is required to have high reflectivity for a wide wavelength band. To achieve this, the machining point beam reflection layer 64 includes a multi-layered film formed by stacking the high-refractivity layers 66 and the low-refractivity layers 67 alternately, and a metal film 68 arranged on the outermost surface of the multi-layered film. The metal film is made of gold, silver, copper, or aluminum.

Second Embodiment

Figure 6A:
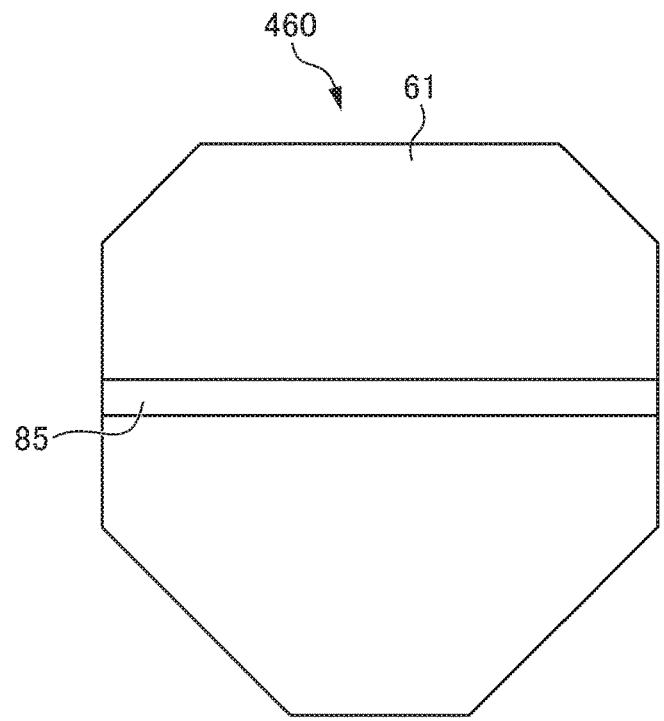
FIG. 6A is a front view of a galvanometer mirror as a second embodiment of the present invention.
Figure 6B:
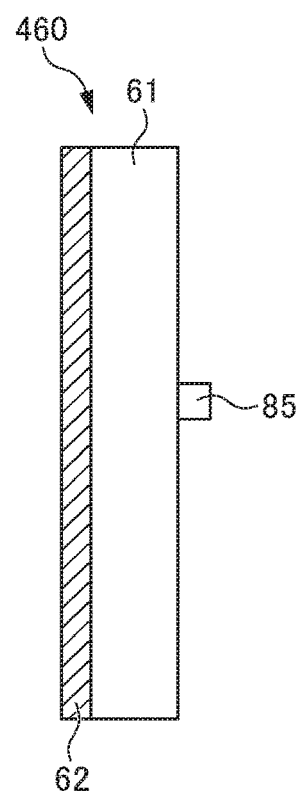
FIG. 6B is a side view of the galvanometer mirror as the second embodiment of the present invention.

FIG. 6A is a front view of a galvanometer mirror 460 according to a second embodiment. FIG. 6B is a side view of the galvanometer mirror 460. The galvanometer mirror 460 according to the second embodiment shown in FIGS. 6A and 6B includes the substrate 61, the laser beam reflection layer 62, and a machining point beam reflection layer 85. The position of the galvanometer mirror 460 is determined by rotating the galvanometer mirror 460 at a high speed. Thus, the galvanometer mirror 460 is required to have lightweight properties allowing the high-speed rotation and strength with which the galvanometer mirror 460 is not to be deformed by acceleration. To achieve this, the machining point beam reflection layer 85 is composed of a straight rib for increasing the strength of the substrate 61. Reflection coating is applied to an upper surface 851, a side surface 852, and a bottom surface 853 of the machining point beam reflection layer 85, and to the back side of the substrate 61. This allows reflection of a machining point beam generated at a machining point.

Figure 6C:
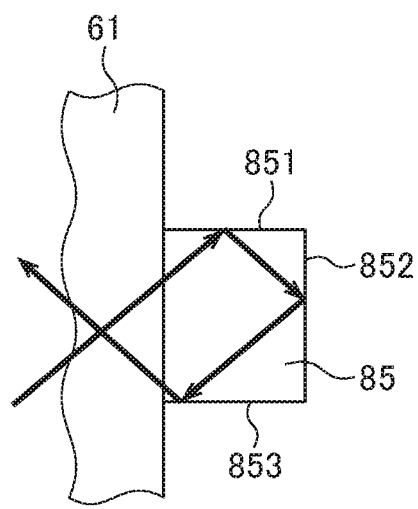
FIG. 6C a sectional view showing a part of FIG. 6B in an enlarged manner.

FIG. 6C is a sectional view showing how a beam generated at a machining point is reflected on the machining point beam reflection layer 85. As shown in FIG. 6C, the beam generated at the machining point on the machining target 70 having a wavelength except a predetermined wavelength is reflected like arrows in the machining point beam reflection layer 85. More specifically, the beam generated at the machining point on the machining target 70 is transmitted through the laser beam reflection layer 62 and the substrate 61, reflected on the machining point beam reflection layer 85, transmitted through the substrate 61 and the laser beam reflection layer 62, and then travels toward the mirror 50 in front of detector.

In the foregoing configuration of the second embodiment, as the machining point beam reflection layer 85 is formed into a rib, the rigidity of the galvanometer mirror 460 is ensured. At the same time, rigidity required for the machining point beam reflection layer 85 and the substrate 61 can be reduced to allow reduction in the thicknesses of the machining point beam reflection layer 85 and the substrate 61. As a result, the weight of the galvanometer mirror 460 is reduced.

The reflection coating is applied to the surfaces of the machining point beam reflection layer 85 entirely. Thus, a beam from a machining point having entered the machining point beam reflection layer 85 can be reflected several times in the machining point beam reflection layer 85, and then reflected on the galvanometer mirror 460.

Third Embodiment

Figure 7A:
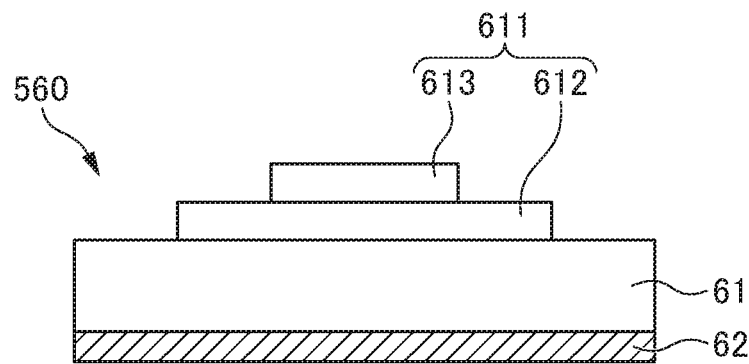
FIG. 7A is a plan view of a galvanometer mirror as a third embodiment of the present invention.
Figure 7B:
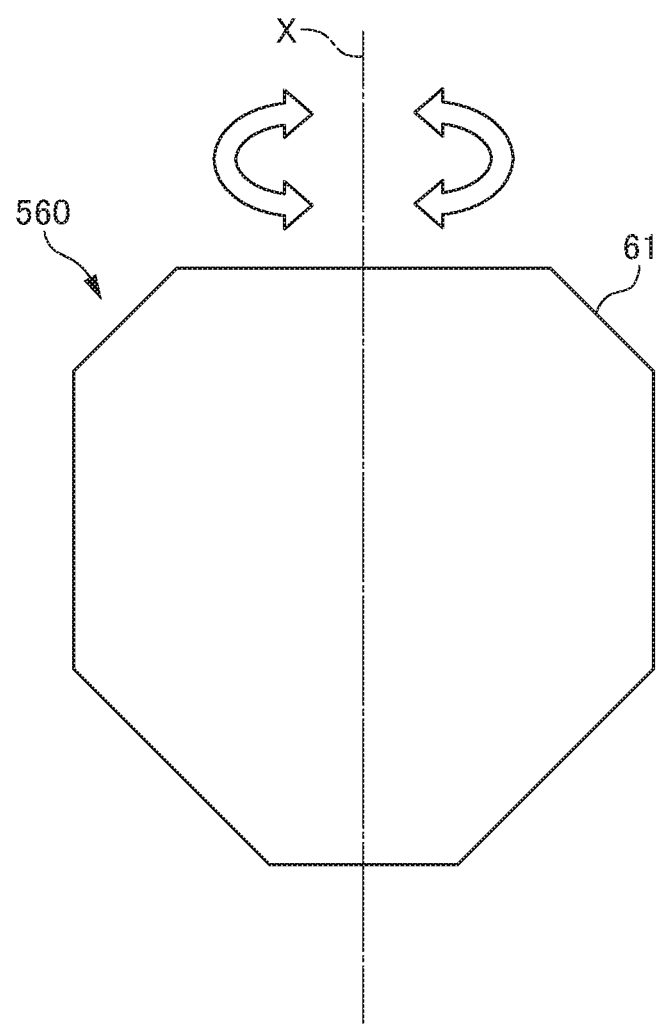
FIG. 7B is a front view of the galvanometer mirror as the third embodiment of the present invention.
Figure 7C:
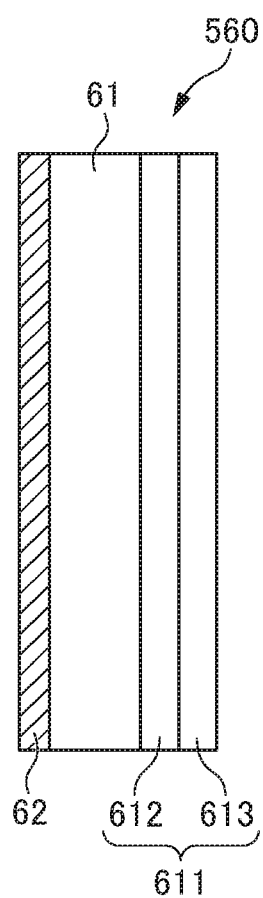
FIG. 7C is a side view of the galvanometer mirror as the third embodiment of the present invention.

FIGS. 7A, 7B, and 7C are a plan view, a front view, and a side view respectively of a galvanometer mirror 560 as a third embodiment of the present invention. The galvanometer mirror 560 according to the third embodiment shown in FIGS. 7A, 7B, and 7C includes the substrate 61, the laser beam reflection layer 62, and a machining point beam reflection layer 611. The machining point beam reflection layer 611 is configured integrally with the substrate 61, and is composed of a projecting part 612 and a projecting part 613 formed like stairs as viewed in a direction orthogonal to a rotary axis X of the substrate 61. The projecting part 612 projects from a part of the substrate 61 as viewed in the direction orthogonal to the rotary axis X of the substrate 61. The projecting part 613 projects from the projecting part 612 as viewed in the direction orthogonal to the rotary axis X of the substrate 61.

The projecting parts 612 and 613 cause reflection of a beam having a wavelength except a predetermined wavelength in the projecting parts 612 and 613. Each of the projecting parts 612 and 613 is formed into a great thickness near the rotary axis X where influence on moment of inertia (inertia) is small, and is formed into a small thickness where influence on moment of inertia is large. Reflection coating is applied to the surfaces of the projecting parts like stairs of the machining point beam reflection layer 611 entirely.

In the foregoing configuration of the third embodiment, the machining point beam reflection layer 611 is the projecting parts like stairs. This suppresses increase in moment of inertia, ensures strength, and achieves lightweight properties.

The reflection coating is applied to the surfaces of the projecting parts like stairs of the machining point beam reflection layer 611 entirely. Thus, a beam from a machining point having entered the machining point beam reflection layer 611 can be reflected several times in the machining point beam reflection layer 611, and then reflected on the galvanometer mirror 560.

Modifications

While the embodiments of the present invention have been described above, the present invention should not be limited to the foregoing embodiments. The substrate may be made of a ceramic-based material. This ceramic-based material also desirably has a thermal expansion coefficient of $1.0 \times 10^{-6}/°$ C. or less. The synthetic quartz described in the foregoing embodiments and examples does not have a cavity. However, the synthetic quartz is not limited to this configuration but it may have a cavity. Forming such a cavity achieves lightweight properties of the galvanometer mirror. A material for the substrate is not limited to the synthetic quartz but it may also be silicon carbide having high strength. In this case, to allow a beam generated at a machining point to be reflected on the machining point beam reflection layer, this material for the substrate is required to have relatively high transmittance.

EXPLANATION OF REFERENCE NUMERALS

45 Laser cutting head
50 Mirror in front of detector
60, 160, 260, 360, 460, 560 Galvanometer mirror
61 Substrate
62 Laser beam reflection layer (first reflection layer)
64 Machining point beam reflection layer (second reflection layer)
66 High-refractivity layer
67 Low-refractivity layer
68 Metal film
80 Detector
85 Machining point beam reflection layer (second reflection layer)
100 Laser oscillator
500 Laser machine
611 Machining point beam reflection layer (second reflection layer)
X Rotary axis

What is claimed is:

1. A galvanometer mirror comprising:
a transparent substrate;
a first reflection layer composed of a first multi-layer film, the first reflection layer arranged on one surface side of the substrate and causing reflection of a laser beam having a predetermined wavelength; and
a second reflection layer arranged on the other surface side of the substrate and having higher reflectivity for a beam having a wavelength except the predetermined wavelength than the first reflection layer, wherein
the second reflection layer is composed of a second multi-layered film and a metal film formed on an outermost surface of the second multi-layered film, wherein the metal film consists of metal,
at an optical path, the galvanometer mirror is contiguously formed such that the second reflection layer is contiguous with the metal film, the substrate is contiguous with the second reflection layer, and the first reflection layer is contiguous with the substrate, and the outermost surfaces of the contiguously formed galvanometer mirror are formed by the metal film and the outermost layer of the first reflection layer.

2. The galvanometer mirror according to claim 1, wherein the substrate has a thermal expansion coefficient of $1.0 \times 10^{-6}/°$ C. or less.

3. The galvanometer mirror according to claim 1, wherein the substrate has transmittance of 80%/cm or more for a beam from 400 to 2000 nm.

4. The galvanometer mirror according to claim 1, wherein a material for the substrate is synthetic quartz.

5. The galvanometer mirror according to claim 1, wherein a material for the metal film is gold, silver, copper, or aluminum.

6. The galvanometer mirror according to claim 1, wherein each of the multi-layered films is a film including high-refractivity layers and low-refractivity layers arranged alternately and repeatedly.

7. A laser machine comprising:
the galvanometer mirror according to claim 1; and
a laser oscillator that emits a laser beam to be applied to the first reflection layer of the galvanometer mirror.

8. The galvanometer mirror according to claim 7, wherein the first reflection layer reflects the laser beam toward a machining target, and the second
reflection layer reflects toward a detector a machining point beam that follows a path for the laser beam in an opposite direction.

9. The galvanometer mirror according to claim 1, wherein the transparent substrate is composed of synthetic quartz.

10. The galvanometer mirror according to claim 1, wherein the reflective layers are each configured to reflect light at a non-perpendicular angle.

* * * * *